United States Patent [19]

Nobuta

[11] Patent Number: 4,759,718
[45] Date of Patent: Jul. 26, 1988

[54] WEAR HAVING CURE TARGET POINTS VISUALLY PLACED

[76] Inventor: Shizuo Nobuta, H-405, 27, Nakadai-3-chome, Itabashi-ku, Tokyo, Japan, 174

[21] Appl. No.: 44,704

[22] Filed: May 1, 1987

[30] Foreign Application Priority Data

Feb. 10, 1987 [JP] Japan .................. 62-018080

[51] Int. Cl.[4] .............................. G09B 23/28
[52] U.S. Cl. .................... 434//262; 434/395;
434/272; 128/735; 128/1 R
[58] Field of Search ............. 128/329 A, 735, 1 R;
434/262, 272, 275, 395

[56] References Cited

U.S. PATENT DOCUMENTS

| | | | |
|---|---|---|---|
| 4,073,296 | 2/1978 | McCall | 128/303 R |
| 4,530,349 | 7/1985 | Metzger | 128/1 R |
| 4,561,851 | 12/1985 | Ferreira et al. | 434/272 |

FOREIGN PATENT DOCUMENTS

| | | | |
|---|---|---|---|
| 1960167 | 6/1971 | Fed. Rep. of Germany | 128/735 |
| 3036392 | 5/1982 | Fed. Rep. of Germany | 128/735 |

OTHER PUBLICATIONS

"Acupuncture, ... an Ancient Chinese Method of Healing", by D. Stillings, *J.A.A.M.I.* vol. 7 No. 1, Jan.-Feb. 1973, p 16.

*Primary Examiner*—Samuel Scott
*Assistant Examiner*—Allen J. Flanigan
*Attorney, Agent, or Firm*—Cushman, Darby & Cushman

[57] ABSTRACT

A training wear usable for students in Oriental medicine school has a number of cure target points printed thereon which are distributed over the whole area of the wear at the position which is specifically determined in accordance with teachings of Oriental medicine. The name of each of the cure target points is placed at the position in the proximity of them. When the wear is put on a student, it is necessary that vertically extending center lines on both the fore and rear surfaces thereof are correctly aligned with a backbone. Each of the cure target points is identified by a target mark in the form of a small circle or a dot.

5 Claims, 1 Drawing Sheet

WEAR HAVING CURE TARGET POINTS VISUALLY PLACED

BACKGROUND OF THE INVENTION

The present invention relates to a wear having a number of cure target points visually placed thereon and more particularly to a training wear for students in Oriental medicine school. Oriental medicine is typically classified into three curing techniques, that is, Shiatsu (finger-pressure therapy), Kyu (moxibustion) and Hari (acupuncture) each of which is practiced by way of the steps of first searching for Tsubo (which corresponds to cure target point in the title of the invention) on the outer surface of a patient and then applying suitable curing operation to the area as defined by Tsubo.

As it is increasingly recognized that Oriental medicine is effective for curing stiff shoulder, lumbago or the like which are often difficult to be cured or are cured with much difficulties by modern Western medicine, many attentions are being paid to Oriental medicine in recent years. At present many students study Oriental medicine in school. As will be apparent from the above description, it is most important to exactly search for Tsubo in Oriental medicine and therefore students in Oriental medicine school must learn the positions where Tsubos are located. According to teachings of Oriental medicine there are existent about 100 Tsubos which are distributed over the whole surface of a human body. Accordingly, it is not easy for students to learn the position where Tsubo is located. In school maps on which the position of Tsubo is shown, photographs of a human body, text and three-dimensional human body model are employed as teaching material. Among these teaching materials the three-dimensional human body model is most effective but a problem is that it is manufactured at an expensive cost. Also other teaching materials have the problem that it takes a long time to exactly learn the position of many Tsubos.

SUMMARY OF THE INVENTION

Hence, the present invention has been made with the foregoing background in mind.

It is an object of the present invention to provide a wear having a number of cure target points (Tsubos) visually placed thereon which assures that students in Oriental medicine school learn the position of Tsubos within a short period of time.

It is other object of the present invention to provide a wear having a number of cure target points (Tsubos) visually placed thereon which is simple to be used and can be produced at an inexpensive cost.

To accomplish the above subjects there is proposed according to the present invention a wear having a number of cure target points visually placed thereon which is characterized in that the cure target points are distributed over the whole area thereof at the position which is specifically determined in accordance with teachings of Oriental medicine, that a name of each of the cure target points is placed at the position in the proximity of them and that utilization of the wear is achieved in such a manner that vertically extending center lines on both the fore and rear surfaces thereof are correctly aligned with the backbone.

In general, the cure target points and their names are printed on cloth material constituting the wear.

It is convenient that each of the cure target points is identified by a target mark in the form of a small circle or a dot having a certain diameter.

Usually, the wear is divided into two parts, that is, upper half and lower half. Alternatively, it may be made in an one-piece structure.

Other objects, features and advantages of the present invention will become readily apparent from reading of the following description which has been prepared in conjunction with the accompanying drawings.

BRIEF DESCRIPTION OF THE DRAWINGS

The present invention will be illustrated in the following drawings in which.

DESCRIPTION OF THE PREFERRED EMBODIMENT

Now, the present invention will be described in a greater detail hereunder with reference to the accompanying drawings which illustrate a preferred embodiment thereof.

In the illustrating embodiment a training wear usable in Oriental medicine school is divided into two parts, one of them being an upper half 1 in the form of a shirt and the other one being a lower half 2 in the form of a trouser.

Figure 1:
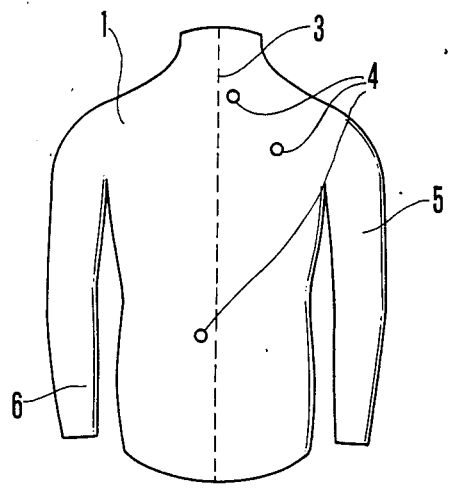
FIG. 1 is a rear view of an upper half of a wear in accordance with an embodiment of the invention.

Specifically, FIG. 1 is a rear view of the upper half 1 which includes a vertically extending rear center line 3 which is aligned with a backbone of a human body. Further, it has a number of target marks 4 in the form of a small circle distributed over the whole rear surface of the upper half 1 each of which is indicative of location of so-called Tsubo (hereinafter referred to as cure target point). Exactly speaking, 40 cure target points are provided over the rear surface of the upper half 1 in accordance with teachings of Oriental medicine but in the drawing only three target marks 4 are shown for the sake of simplification of illustration. Reference numeral 5 designates a left-handed sleeve and reference numeral 6 does a right-handed sleeve.

Figure 2:
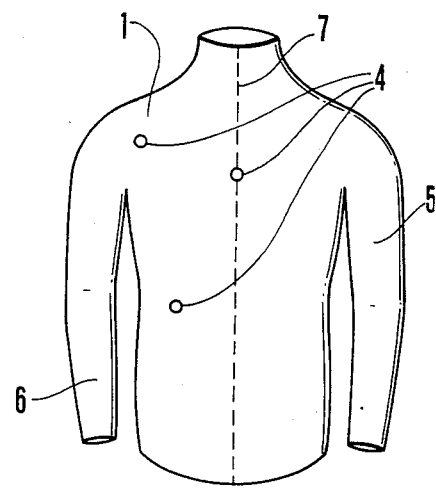
FIG. 2 is a front view of the upper half of the wear in FIG. 1.

FIG. 2 is a front view of the upper half 1 of a training wear which is shown in the same manner as in FIG. 1. The upper half 1 includes a vertically extending fore center line 7 which is also aligned with a backbone. A number of target marks 4 also in the form of a small circle are distributed over the fore surface of the upper half 1 also in accordance with teachings of Oriental medicine. For the sake of simplification of illustration only three target marks are shown in the drawing. Exactly speaking, 36 cure target points are provided over the fore surface of the upper half 1. It should be noted that both the center lines 3 and 7 function as reference line for allowing the target marks to correctly overlap true target points on the outer surface of the upper body of a student when he puts on the training wear.

Figure 3:
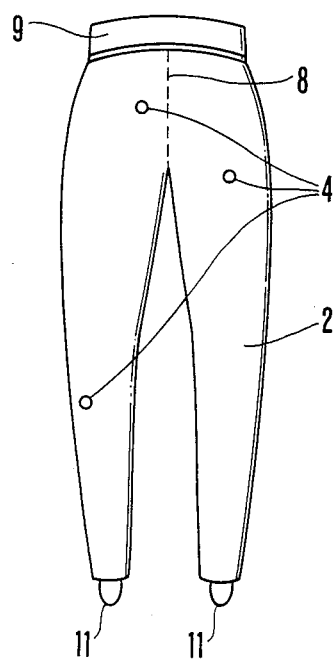
FIG. 3 is a front view of a lower half of the wear.
Figure 4:
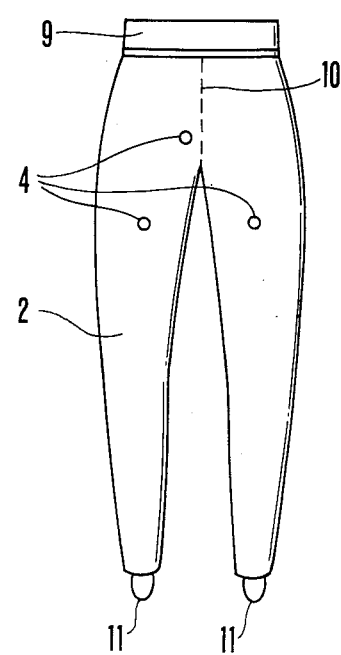
FIG. 4 is a rear view of the lower half of the wear in FIG. 3.

Next, FIG. 3 and 4 are a front view and a rear view of the lower half 2 of the training wear. In both the drawings only three target marks 4 are shown but 9 cure target points are actually provided over both the fore and rear surfaces of the lower half 2 respectively.

In FIG. 3 reference numeral 8 designates a center line which is an extension from the center line 7 in FIG. 2 and reference numeral 9 does a tightening portion in the form of a band made of elastic material such as rubber or the like. Similarly, a center line 10 in FIG. 4 is an extension from the center line 3 in FIG. 1. To inhibit the lower half 2 from becoming loosened, it is provided with two U-shaped fastening portions 11 at the lowermost ends of both the foot portions thereof in the same manner as a conventional training trouser.

To identify each of the cure target points, their names are written or printed at the position in the proximity of them, although it is not shown in the drawings for the purpose of simplification of illustration.

In the illustrated embodiment each of the target marks is represented by a small circle. Alternatively, it may be represented by a dot having a certain diameter.

Further, in the illustrated embodiment the training wear is divided into two parts, that is, upper half and lower half. The present invention should not be limited only to this but the training wear may be made in an one-piece structure.

Advantageous effects of the present invention will be described below.

When a training wear of the invention is put on by each of students in an Oriental medicine school, studying is carried out in such a manner that one student utilizes the training wear which is correctly put on another student and vice versa, resulting in studying efficiency being increased remarkably in contrast with the case where a conventional human body model or the like means is employed for the purpose of studying. Further, since mutual discussion and suggestion can be made among students with the use of their training wear, recognizing of the position of cure target points and learning of their names can be achieved easily within a short period of time. Moreover, speaking from the teacher's side, he can teach and instruct students with a reduced amount of labor and effort.

Finally, the present invention should not be limited only to a training wear for students in Oriental medicine school but any one other than students may utilize the wear of the invention for the purpose of his own curing.

What is claimed is:

1. A wear having a number of cure target points indicated thereon, characterized in that said cure target points are distributed over the whole area thereof at the position which is specifically determined in accordance with teachings of Oriental medicine, that a name of each of the cure target points is placed at a position in the proximity of each and that vertically extending center lines on both the fore and rear surfaces thereof are provided for alignment with a wearer's backbone.

2. A wear as defined in claim 1, characterized in that each of the cure target points is identified by a target mark in the form of a small circle or a dot having a certain diameter.

3. A wear as defined in claim 1, characterized in that said wear is divided into two parts, that is, upper half and lower half.

4. A wear as defined in claim 1, characterized in that said wear is made in an one-piece structure.

5. A wear as defined in claim 1, characterized in that the cure target points and their names are printed on the cloth material constituting the wear.

* * * * *